(12) United States Patent
Enthammer

(10) Patent No.: US 8,899,938 B2
(45) Date of Patent: Dec. 2, 2014

(54) BLADE FOR A TURBOMACHINE

(76) Inventor: Walter Enthammer, Anthering (AT)

( * ) Notice: Subject to any disclaimer, the term of this patent is extended or adjusted under 35 U.S.C. 154(b) by 544 days.

(21) Appl. No.: 13/063,883

(22) PCT Filed: Sep. 22, 2009

(86) PCT No.: PCT/EP2009/062227
§ 371 (c)(1),
(2), (4) Date: Mar. 14, 2011

(87) PCT Pub. No.: WO2010/031871
PCT Pub. Date: Mar. 25, 2010

(65) Prior Publication Data
US 2011/0171037 A1    Jul. 14, 2011

(30) Foreign Application Priority Data

Sep. 22, 2008   (AT) .................. A 1477/2008

(51) Int. Cl.
*B64C 27/46*  (2006.01)
*B64C 27/51*  (2006.01)
*F03D 1/06*  (2006.01)

(52) U.S. Cl.
CPC ............ *B64C 27/463* (2013.01); *F03D 1/0633* (2013.01); *F05B 2260/96* (2013.01); *Y02E 10/721* (2013.01)
USPC ........................................ 416/236 R; 416/228

(58) Field of Classification Search
CPC ............ F05B 2260/96; F05B 2240/30; F05B 2240/301; Y02E 10/721; F03D 1/0633; F03D 1/0641; F03D 1/0675; F03D 1/0683; F03D 3/005; F03D 3/061; F04D 29/38; F04D 29/384; F04D 29/661; F04D 29/663; F04D 29/667; F04D 29/681; F01D 5/141; F01D 5/145; F01D 5/10; F01D 5/16; F01D 25/06
USPC ........................... 416/223 R, 228, 235, 236 R
See application file for complete search history.

(56) References Cited

U.S. PATENT DOCUMENTS 218,438 A * 8/1879 Heath .................. 416/231 R
833,850 A * 10/1906 Smith ........................ 416/234
(Continued)

FOREIGN PATENT DOCUMENTS

| CN | 1745245 A | 3/2006 |
| CN | 1930394 A | 3/2007 |

(Continued)

OTHER PUBLICATIONS

International Search Report for PCT/EP2009/062227, mailed Nov. 5, 2010.

(Continued)

*Primary Examiner* — Nathaniel Wiehe
*Assistant Examiner* — Wayne A Lambert
(74) *Attorney, Agent, or Firm* — Nixon & Vanderhye P.C.

(57) ABSTRACT

A blade for a turbomachine, in particular for a rotor of a helicopter. A main section is designed to create a flow in the surrounding medium and extends from a hub section to a blade tip region. An end piece for influencing eddy formation in the blade tip region. To achieve a substantial noise reduction, the end piece is designed as a rounded flow body comprising at least one groove originating in the transition region between the body and the main section, substantially in the direction of the blade axis and curving towards the trailing edge of the blade.

25 Claims, 5 Drawing Sheets

(56) References Cited

U.S. PATENT DOCUMENTS

| | | | |
|---|---|---|---|
| 1,515,268 A * | 11/1924 | Morrow | 416/228 |
| 2,193,686 A * | 3/1940 | Craddock | 416/228 |
| D137,292 S * | 2/1944 | Chojmik | D12/214 |
| 2,408,788 A * | 10/1946 | Ludington et al. | 416/23 |
| 3,044,559 A * | 7/1962 | Chajmik | 416/228 |
| 4,077,741 A * | 3/1978 | Lowson et al. | 416/228 |
| 4,168,939 A | 9/1979 | Schmitz et al. | |
| 4,334,828 A | 6/1982 | Moffitt | |
| 4,451,206 A * | 5/1984 | Philippe et al. | 416/228 |
| 4,636,143 A * | 1/1987 | Zeides | 416/228 |
| 4,880,355 A * | 11/1989 | Vuillet et al. | 416/228 |
| 5,114,099 A * | 5/1992 | Gao | 244/130 |
| 5,181,830 A * | 1/1993 | Chou | 416/223 R |
| 5,312,228 A * | 5/1994 | De Jong et al. | 416/191 |
| 5,584,661 A | 12/1996 | Brooks | |
| 5,785,282 A | 7/1998 | Wake et al. | |
| 5,813,625 A | 9/1998 | Hassan et al. | |
| 5,927,948 A * | 7/1999 | Perry et al. | 416/228 |
| 5,951,162 A * | 9/1999 | Weetman et al. | 366/328.1 |
| 5,992,793 A * | 11/1999 | Perry et al. | 244/17.11 |
| 6,168,383 B1 * | 1/2001 | Shimizu | 416/228 |
| 6,260,809 B1 | 7/2001 | Egolf et al. | |
| 2004/0197194 A1 | 10/2004 | Leishman et al. | |
| 2005/0061921 A1 | 3/2005 | Egolf | |
| 2005/0065850 A1 | 3/2005 | Mitchell et al. | |
| 2006/0018759 A1 | 1/2006 | Moser | |
| 2007/0248466 A1 | 10/2007 | Lotrionte | |
| 2008/0213097 A1 * | 9/2008 | Oleson et al. | 416/210 R |
| 2010/0028157 A1 * | 2/2010 | Kinzie et al. | 416/223 R |

FOREIGN PATENT DOCUMENTS

| | | |
|---|---|---|
| DE | 197 06 668 | 9/1998 |
| DE | 10 2006 023 557 | 11/2007 |
| EP | 0 493 303 | 4/1995 |
| EP | 1 035 014 | 9/2000 |
| EP | 0 782 956 | 3/2002 |
| JP | 2001-184099 A | 7/2001 |
| JP | 2002-284099 | 10/2002 |
| RU | 2118270 C1 | 8/1998 |
| WO | WO 92/05341 | 4/1992 |

OTHER PUBLICATIONS

Foreign-language Written Opinion of the International Searching Authority for PCT/EP2009/062227, mailed Nov. 5, 2010.

* cited by examiner

BLADE FOR A TURBOMACHINE

This application is the U.S. national phase of International Application. No. PCT/EP2009/062227 filed 22 Sep. 2009, which designated the U.S. and claims priority to Austria Application No. A 1477/2008 filed 22 Sep. 2008, the entire contents of each of which are hereby incorporated by reference.

The invention relates to a blade for a turbomachine, in particular for a rotor of a helicopter, comprising a main portion which is formed so as to create a flow in the surrounding medium and which extends from a hub portion to a blade tip region, an end piece for influencing eddy formation being provided in the blade tip region.

Within the meaning of the invention, blades are understood to be components which are basically formed so as to influence flows in a medium, including in particular the blades of rotors such as the propellers of aeroplanes or the rotors of helicopters. However, the present invention also relates to turbomachines which are driven by the flow, for example blades in wind turbines or in turbines in general.

However, as well as these rotating components, the invention also relates to the wings of aeroplanes or the like.

It is known that eddies form in the relevant medium, when it flows around, in the region of the blade tip of a blade of this type, and not only influence the efficiency of the device but may also lead to noise problems. The issue of operating noise is particularly relevant in the field of helicopters in particular.

Various measures in the region of the blade tip have already been proposed for reducing the noise emission.

U.S. Pat. No. 5,785,282 A proposes a special backswept form of the blade tip with additional flow guiding surfaces. A similar solution is proposed in EP 0 493 303 B. U.S. Pat. No. 6,260,809 B discloses a further special form of the blade tip for influencing eddy formation. Reference should further be made to WO 2004/067956 A, which discloses a range of measures for increasing the efficiency of wind turbines.

All of the above solutions are relatively expensive and still only have an insufficient effect as regards reducing the noise emission. Further known solutions with similar drawbacks are disclosed in GB 557 581 A and U.S. Pat. No. 5,114,099.

It is an object of the present invention to develop a blade of the aforementioned type in such a way as to achieve a substantial reduction in eddy formation, and thus in noise emission, with the simplest possible construction. The efficiency of the turbomachine itself should not be reduced, but actually increased in so far as possible.

These objects are achieved according to the invention in that the end piece is formed as a rounded flow body comprising at least one groove, which starts substantially in the direction of the blade axis, in the transition region into the main portion, and curves towards the trailing edge of the blade.

Within the meaning of the present invention, the main portion is the part of the blade which by virtue of the particular contour thereof provides the majority of the flow effect. An end region defining the free end of the blade extends on one end of the main portion. The hub portion, which in rotors is located in the region of the axis of rotation, is arranged on the opposite end. In the case of a wing of a fixed-wing aircraft, the hub portion is considered to be the portion which forms the transition into the fuselage of the aeroplane.

The end piece is formed in a manner according to the invention as a rounded flow body, i.e. in a longitudinal section through the blade a smooth transition is provided from the upper side of the blade, the end piece curving constantly as far as an outline, and joining tangentially, with constant curvature, into the underside of the main portion from the outline. There is also a constant curvature from the front side to the rear side of the blade in the plane of the blade itself.

It is essential to the invention that at least one groove is provided in the end piece, and starts substantially in the axial direction of the blade and curves towards the trailing edge as it continues towards the periphery line. This groove has an influence on the flow in the region of the blade tip, and this influence has a favourable effect on the efficiency and noise emission.

It is particularly advantageous for the groove to end substantially in the flow direction at the outline of the end piece. In this way a particularly high efficiency can be achieved. The outline is the line which defines the maximum extent of the end piece in the plane of the blade in this region.

It is particularly advantageous for the groove to join a corresponding groove on the opposite profile side at the outline of the end piece. In this way, a continuous groove is formed, which is formed substantially V-shaped in form in a plan view and extends continuously from a transition region into the main portion on the blade upper side to a transition region into the main portion on the blade underside. This measure has been found to be particularly effective.

Further, it is particularly advantageous for the effect if the groove is convex in form in the flow direction. This means that the curvature is directed towards the trailing edge.

It is further particularly advantageous for the groove to become increasingly deep and wide starting from the transition region. A particularly large increase in the noise level can be achieved in this way.

A particularly advantageous variant configuration of the present invention provides that at least three grooves are provided in succession.

In the following, the present invention will be described in greater detail by way of the embodiments shown in the figures, in which.

Figure 1:
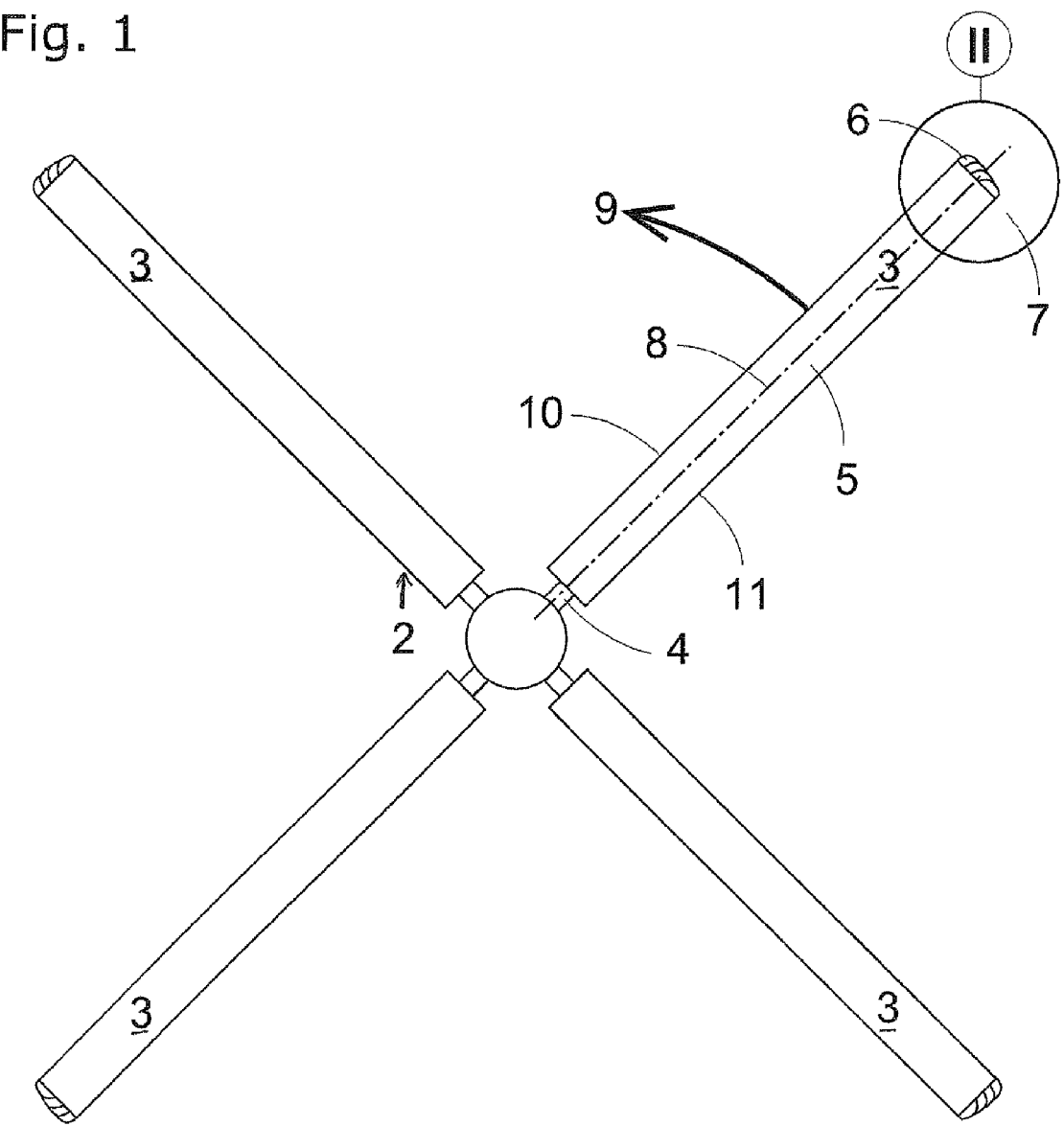
FIG. 1 is a schematic plan view of a rotor of a helicopter (not shown)

The rotor 2 of FIG. 1 has four blades 3. Each of the blades 3 has a hub portion 4, a main portion 5, and an end piece 6 in the blade tip region 7. The main portion 5 is elongate in form and extends substantially along the blade axis 8.

The direction of rotation of the rotor is shown by the arrow 9, and so the blade 3 has a leading edge 10 and a trailing edge 11.

Figure 2:
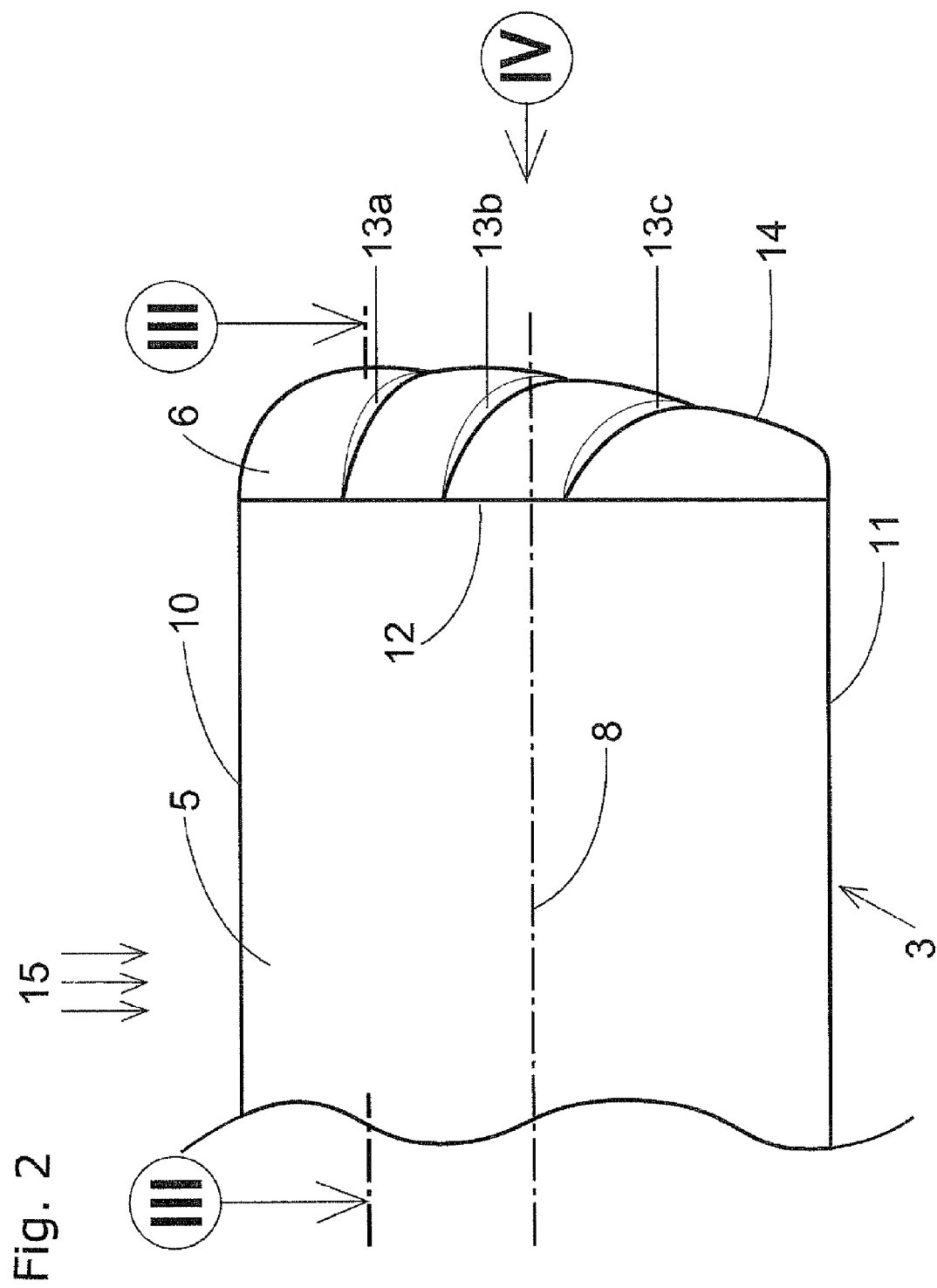
FIG. 2 is a detail II of the rotor of FIG. 1.

FIG. 2 shows the blade tip region 7 on an enlarged scale. There is a transition region 12, drawn as a corresponding contour line, between the main portion 5 and the end piece 6.

On the upper side 17 (visible in FIG. 2) of the blade 3, the end piece 6 has three grooves 13a, 13b, 13c, which start substantially parallel to the blade axis 8 in the transition region 12 and extend with a constant curvature towards the outline 14. The grooves 13a, 13b, 13c are thus convex towards the leading edge 10. The flow direction of the surrounding medium is shown by the arrows 15 in FIG. 2.

Figure 3:
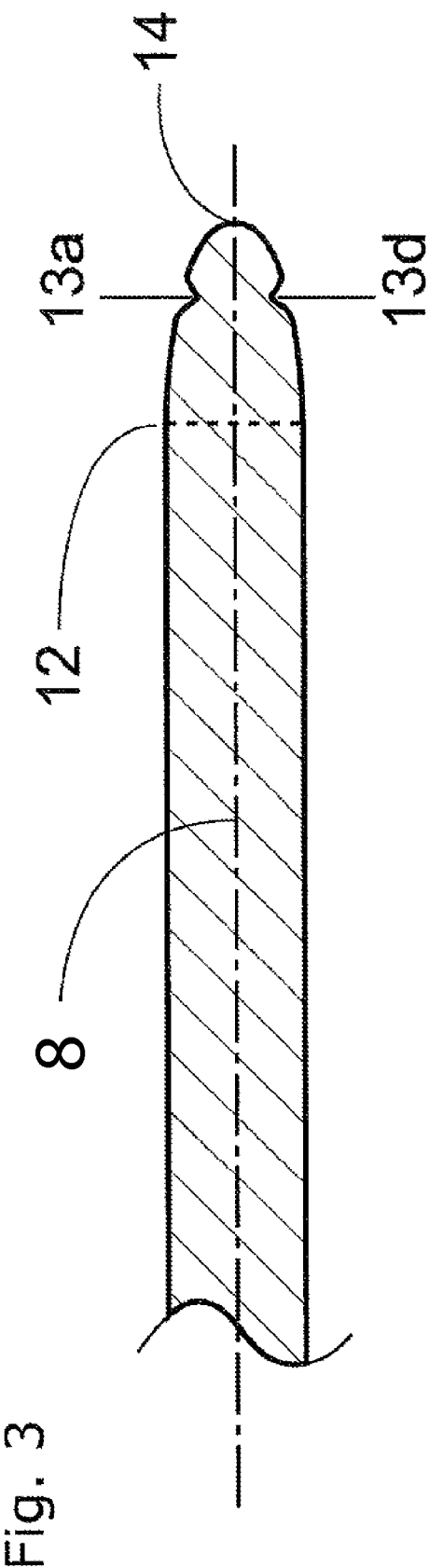
FIG. 3 is a section along the line III-III in FIG. 2.

It is clear from FIG. 3 that the width of the end piece 6 is approximately 80% of the thickness, the thickness being the greatest extent of the blade 3 in the transition region 12 transverse to the plane 16 of the rotor blade 3.

Figure 4:
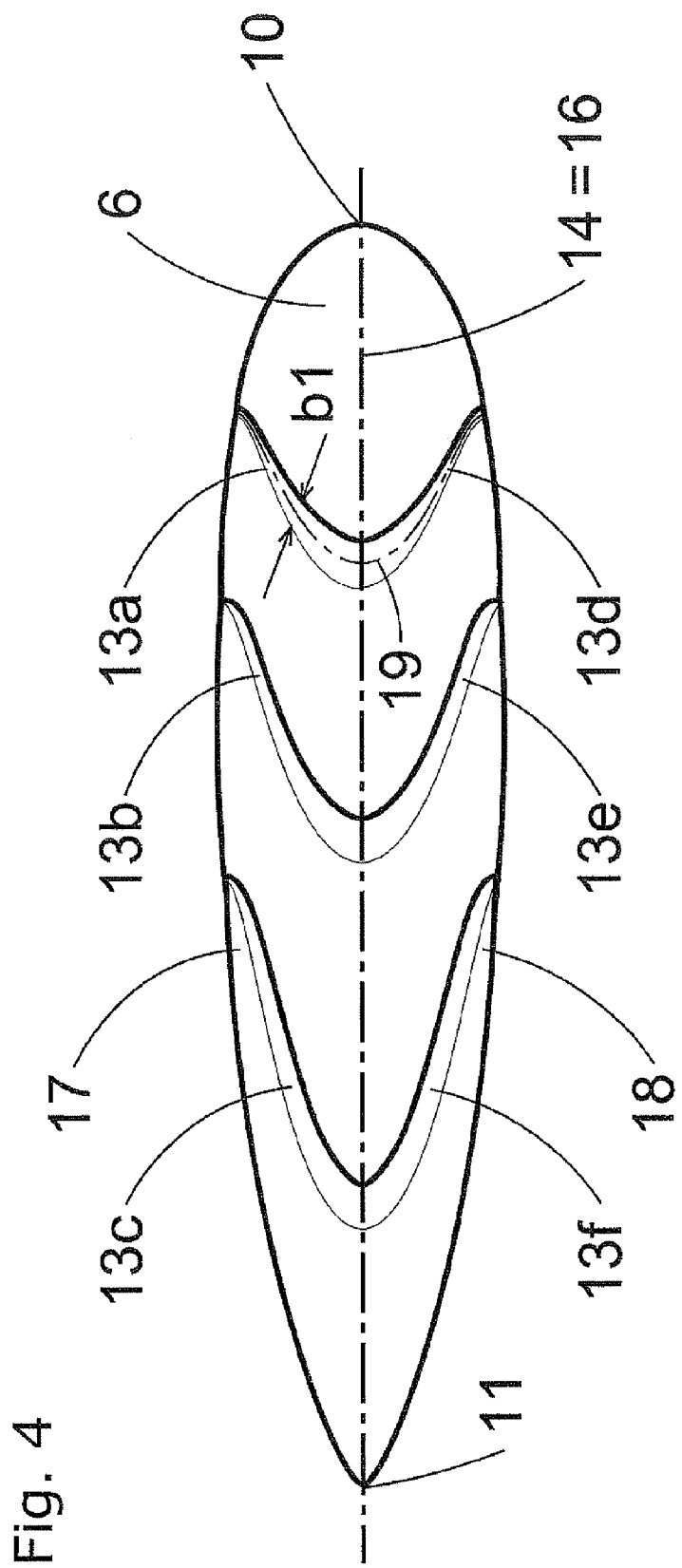
FIG. 4 is a view in the direction of the arrow IV in FIG. 2.

FIG. 4 is exaggerated to make it easier to understand the thickness dimension. It is clear that the end piece 6 is formed symmetrically about the plane 16 of the rotor blade 3. In the region of the outline 14, the grooves 13a, 13b, 13c on the upper side 17 therefore transition into analogous grooves 13d, 13e and 13f on the underside 18 of the end piece 6. By way of example, 19 denotes the centreline of the groove 13a, which is convex in form towards the leading edge 10 and transitions into the outline 14 substantially tangentially. It is further clear that the width $b_1$ of the groove 13a becomes greater towards the outline 14. The depth (not shown) of the groove 13a also increases.

Figure 5:
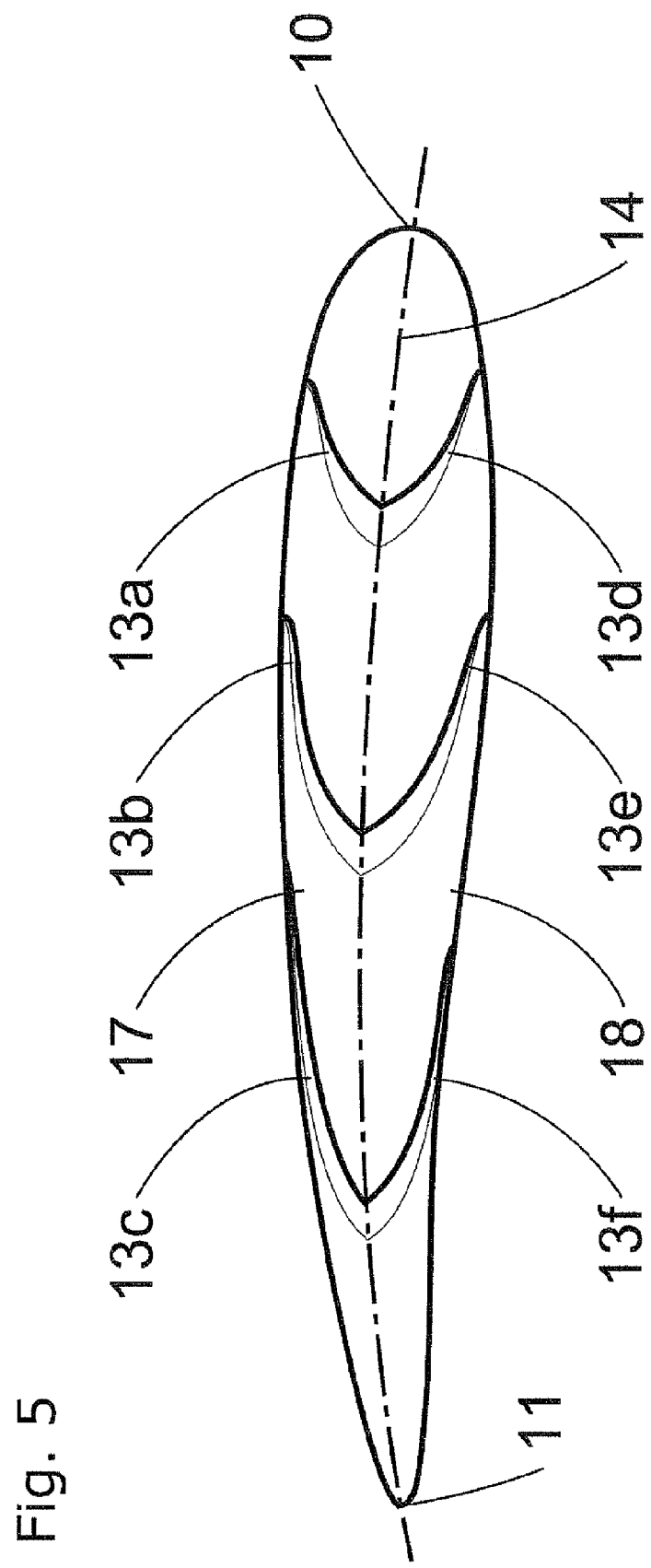
FIG. 5 shows an alternative variant configuration of the invention.

The variant configuration of FIG. 5 shows an application in which the blade 3 has a wing profile, rather than being formed symmetrically in the blade tip region 7.

These transition regions between the mutually associated grooves 13a, 13d; 13b, 13e; 13c, 13f are flow-optimised and rounded.

The present invention makes it possible to reduce the noise emissions of turbomachines considerably.

The invention claimed is:

1. Blade for a turbomachine, the blade having a leading edge and a trailing edge, the blade comprising:
a main portion which is formed so as to create a flow in the surrounding medium when the blade leading edge moves relative to the medium, the main portion extending from a hub portion to a blade tip region including a blade tip, and
an end piece for influencing eddy formation being provided in the blade tip region,
the end piece is formed as a rounded flow body comprising first and second blade sections with the blade tip disposed between the first and second blade sections, the first and second blade sections defining at least one groove which starts in the first blade section and continues through the blade tip into the second blade section, the at least one groove in the first blade section being oriented substantially in the axial direction of the blade, in a transition region of the first blade section into the main portion, and curving relative to the blade axis, convexly towards the trailing edge of the blade to the blade tip, the at least one groove in the second blade section being oriented substantially in the axial direction of the blade, in a transition region of the second blade section into the main portion, and curving relative to the blade axis, covexly towards the trailing edge of the blade to the blade tip, the at least one groove in the first blade section and the at least one groove in the second blade section together defining a curve apex at the blade tip that points to the blade trailing edge.

2. Blade according to claim 1, wherein the at least one groove in the first blade section is defined substantially in the flow direction at the outline of the end piece.

3. Blade according to claim 1, wherein the at least one groove on the first blade section joins the corresponding at least one groove on the second blade section and said grooves together span opposite profile sides of the blade end piece at the outline of the end piece.

4. Blade according to claim 1, wherein the at least one groove in the first blade section is convex in form in the flow direction.

5. Blade according to claim 1, wherein the at least one groove in the first blade section becomes increasingly deep starting from the transition region.

6. Blade according to claim 1, wherein the at least one groove in the first blade section becomes increasingly wide starting from the transition region.

7. Blade according to claim 1, wherein at least three grooves are provided adjacent to one another in the first and second blade sections.

8. Blade according to claim 1, wherein the end piece is formed asymmetrically about the plane of the rotor blade.

9. The blade of claim 1 wherein the blade comprises a helicopter rotor.

10. The blade of claim 1 wherein the blade comprises a rotor.

11. The blade of claim 1 wherein the blade defines a plurality of said grooves that follow similar spaced-apart paths.

12. The blade of claim 1 wherein the rounded flow body provides a smooth transition in a longitudinal section through the blade from an upper side of the blade, the end piece curving constantly as far as a line which defines the maximum extent of the end piece in the plane of the blade and joining tangentially, with constant curvature, into the underside of the main portion from the line.

13. The blade of claim 1 wherein the rounded flow body is rounded from the leading edge to the trailing edge.

14. The blade of claim 1 wherein the blade has a leading side edge and a trailing side edge, and the at least one groove in the first blade section starts substantially parallel to the blade axis and curves towards the trailing side edge of the blade.

15. Wing blade having leading and trailing edges, the blade comprising:
a main portion extending along a blade axis from a hub portion to a blade tip region and structured so as to create a flow in the surrounding medium as the blade leading edge moves relative to the medium,
the blade tip region comprising an end piece rounded flow body for influencing eddy formation terminating in a blade tip,
the end piece comprising first and second blade sections with the blade tip disposed therebetween, the first and second blade sections having a plurality of spaced-apart curved grooves disposed therein, each of the plurality of curved grooves having ends disposed respectively in transition regions of each of the first and second blade sections from the end piece into the main portion, each groove extending from the groove end in each of the first and section blade sections substantially in the direction of the blade axis and curving relative to the blade axis, convexly towards the trailing edge of the blade to the blade tip, the plurality of grooves in the first blade section and the plurality of grooves in the second blade section together defining curve apexes at the blade tip that point to the blade trailing edge.

16. The blade of claim 15 wherein the blade tip region has no holes therethrough.

17. The blade of claim 15 wherein the blade comprises a helicopter rotor.

18. The blade of claim 15 wherein the blade comprises a rotor.

19. The blade of claim 15 wherein the plurality of spaced-apart curved grooves follow similar spaced-apart paths.

20. The blade of claim 15 wherein the rounded flow body provides a smooth transition in a longitudinal section through the blade from an upper side of the blade, the end piece curving constantly as far as a line which defines the maximum extent of the end piece in the plane of the blade and joining tangentially, with constant curvature, into the underside of the main portion from the line, each groove starting substantially in the direction of the blade axis, in the transition region into the main portion, and curving towards the trailing edge of the blade.

21. The blade of claim 15 wherein the rounded flow body is rounded from the leading to the trailing edge, each groove starting substantially in the direction of the blade axis, in a transition region into the main portion, and curving towards the trailing edge of the blade.

22. The blade of claim 15 wherein the blade has a leading side edge and a trailing side edge, and the grooves start substantially parallel to the blade axis, in the transition region into the main portion, and curve towards the trailing side edge of the blade.

23. Blade for a turbomachine, the blade having a leading edge and a trailing edge, an upper side and an underside, the blade comprising:
- a main portion which is formed so as to create a flow in the surrounding medium when the blade leading edge moves relative to the medium, the main portion extending from a hub portion to a blade tip region including a blade tip, and
- an end piece for influencing eddy formation being provided in the blade tip region,
- the end piece being formed as a rounded flow body comprising an upper side, a lower side, and a blade tip disposed therebetween, the blade upper side and lower side together defining at least one groove defined in the upper side through the blade tip to the lower side, the rounded flow body providing a smooth transition in a longitudinal section through the blade from the upper side of the blade, the end piece curving constantly as far as a line which defines the maximum extent of the end piece in the plane of the blade and joining tangentially, with constant curvature, into the underside of the main portion from the line, the groove starting substantially in the direction of the blade axis, in a transition region into the main portion, and curving towards the trailing edge of the blade, the groove defined in the upper side through the blade tip to the lower side having an apex at the blade tip that points to the blade trailing edge.

24. Blade for a turbomachine, the blade having a leading edge and a trailing edge, the blade comprising:
- a main portion which is formed so as to create a flow in the surrounding medium when the blade leading edge moves relative to the medium, the main portion extending from a hub portion to a blade tip region including a blade tip, and
- an end piece for influencing eddy formation being provided in the blade tip region,
- the end piece being formed as a rounded flow body comprising first and second blade sections with the blade tip region disposed therebetween, at least one groove being defined in the first blade section through the blade tip to the second blade section, the rounded flow body being rounded from the leading to the trailing edge, the at least one groove starting substantially in the direction of the blade axis, in a transition region of the first blade section into the main portion, and curving towards the trailing edge of the blade, the at least one groove starting substantially in the direction of the blade axis in a transition re on of the second blade section into the main portion, and curving towards the trailing edge of the blade, the groove defined in the first blade section through the blade tip to the second blade section having an apex at the blade tip that points to the blade trailing edge.

25. Blade for a turbomachine, the blade having a leading side edge and a trailing side edge, the blade comprising:
- a main portion which is formed so as to create a flow in the surrounding medium when the blade leading side edge moves relative to the medium, the main portion extending from a hub portion to a blade tip region including a blade tip, and
- an end piece for influencing eddy formation being provided in the blade tip region,
- the end piece being formed as a rounded flow body comprising first and second blade sections with the blade tip region therebetween, —at least one groove, which starts in the first blade section and extends through the blade tip to the second blade section the at least one groove starting in the first blade section substantially parallel to the blade axis, in a transition region of the first blade section into the main portion, and curves towards the trailing side edge of the blade, the at least one groove also starting substantially parallel to the blade axis, in a transition region of the second blade section into the main portion, and curving towards the trailing side edge of the blade, the at least one groove defined in the first blade section extending through the blade tip to the second blade section defining an apex at the blade tip that points to the blade trailing side edge.

\* \* \* \* \*

UNITED STATES PATENT AND TRADEMARK OFFICE
CERTIFICATE OF CORRECTION

| | |
|---|---|
| PATENT NO. | : 8,899,938 B2 |
| APPLICATION NO. | : 13/063883 |
| DATED | : December 2, 2014 |
| INVENTOR(S) | : Walter Enthammer |

It is certified that error appears in the above-identified patent and that said Letters Patent is hereby corrected as shown below:

In the Specification

Column 2, line 28, change "increase" to -- decrease --

Signed and Sealed this
Twenty-first Day of April, 2015

Michelle K. Lee
*Director of the United States Patent and Trademark Office*